Jan. 14, 1958     E. R. BROWN, JR     2,819,784
TRANSFER PALLET

Filed March 13, 1956     4 Sheets-Sheet 1

INVENTOR.
EVERETT R. BROWN, JR.
BY
AGENT

Jan. 14, 1958  E. R. BROWN, JR  2,819,784
TRANSFER PALLET
Filed March 13, 1956  4 Sheets-Sheet 2

INVENTOR.
EVERETT R. BROWN, JR.
BY
Carl H. Synnestvedt
AGENT

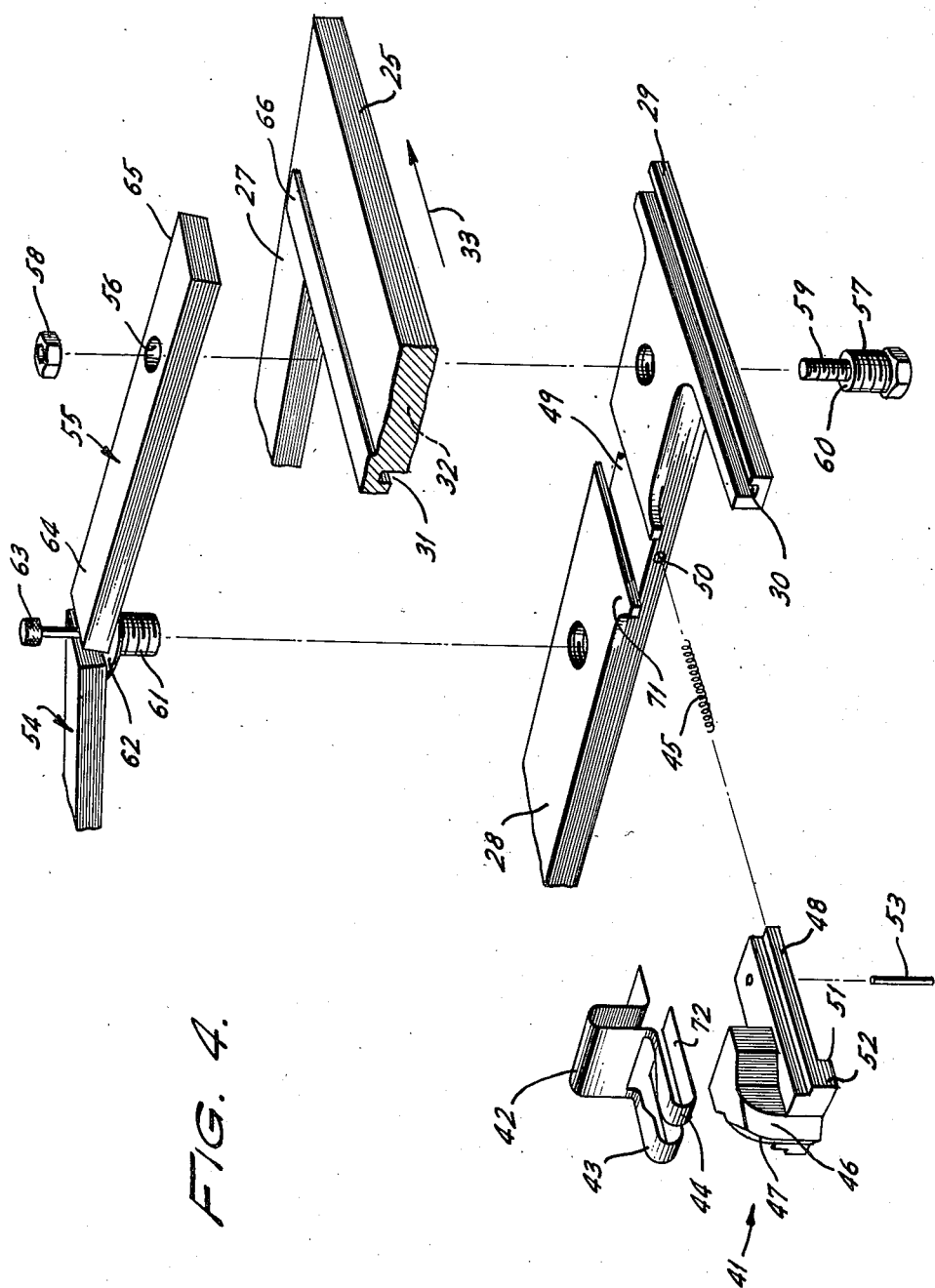

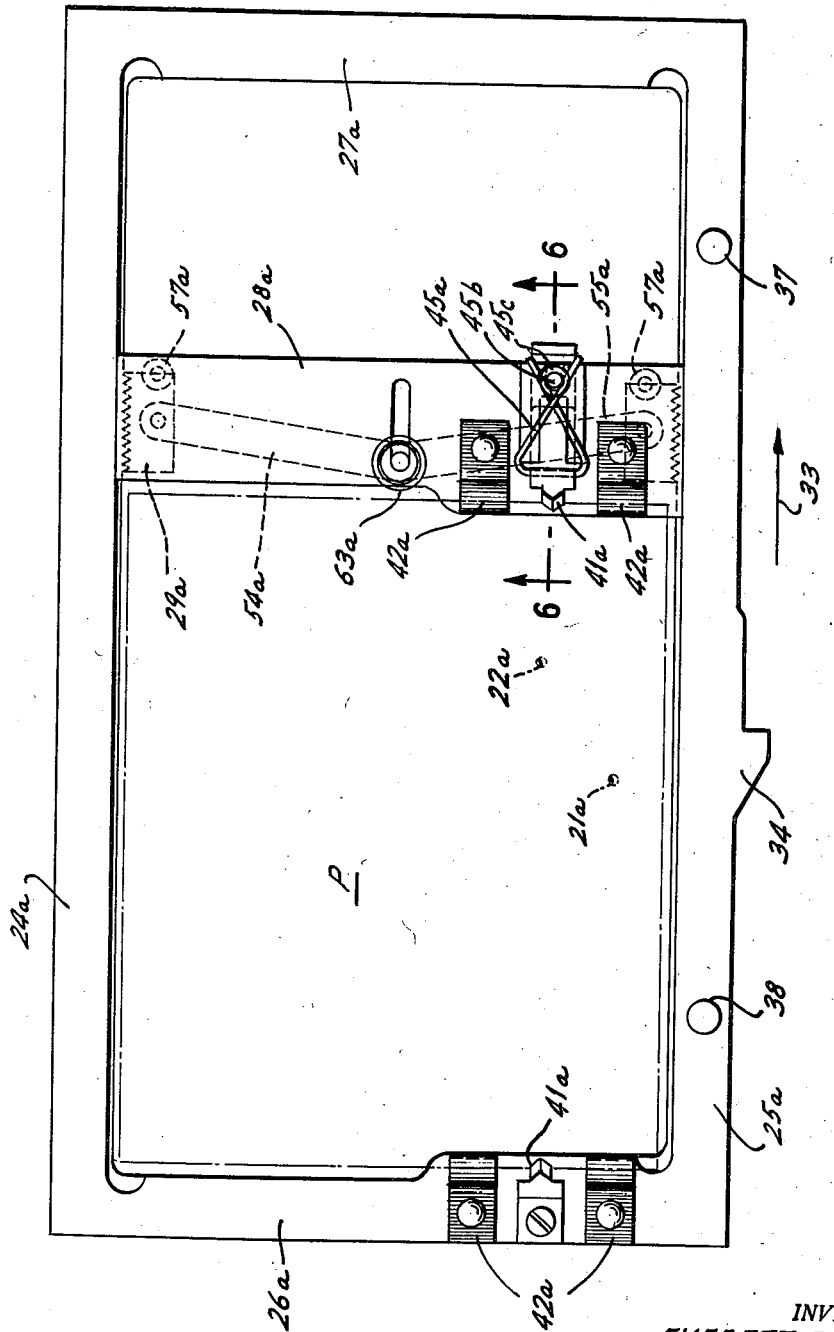

United States Patent Office 2,819,784
Patented Jan. 14, 1958

2,819,784

TRANSFER PALLET

Everett R. Brown, Jr., Warrington, Pa., assignor to Philco Corporation, Philadelphia, Pa., a corporation of Pennsylvania Application March 13, 1956, Serial No. 571,252

8 Claims. (Cl. 198—19)

This invention relates to transfer pallets or carriers for electrical circuit panels and the like.

Such carriers or pallets are used principally, although not exclusively, in the mechanized mass production of circuit panels for television receivers and the like. In this field it is now usual to provide a series of fabricating heads, lined up along an elongated transfer guide structure for the panels to be fabricated, each head being adapted to perform a fabricating operation such as punching, drilling, forming, imprinting, component-inserting, soldering, varnishing, testing, storing, or the like. It is necessary to locate each successive panel accurately with respect to each successive fabricating head and for this purpose to provide a dependable reference system. A flexible conveyor belt supporting the panels, which often is a most convenient means for transferring the panels along the series of fabricating heads, is not, by itself, a very accurate device for reference purposes. Therefore, pallets may be required as a means for obtaining accuracy in locating and registering the panels relative to the fabricating heads, in conjunction with the use of such a conveyor.

With greater particularity, the function of the fabricating transfer pallets is connected with the fact that the circuit panels, in their subsequent installation and use, must fit a variety of major equipment designs, as a result of which their own design cannot be shaped so as to facilitate transfer and related fabricating operations. Moreover, the designs of ultimate equipment units and therefore the designs of panels are subject to frequent and manifold modifications, changing the shapes of the panels, their thicknesses and other dimensions, their friction coefficients and material constants and other characteristics and thereby deeply and variously affecting the manner in which the panels engage the conveying belts and cooperating structures, contacting them during the fabrication processes. It would be highly undesirable and in fact impossible in each case of panel redesign to correspondingly modify or re-adjust a large and precision-built transfer structure, forming a major and permanent part of the mechanized fabricating machinery; on the other hand it is often undesirable to compromise, as to the best transfer and fabricating operation. The pallets, accordingly, serve as intermediary devices, adapting the panels to the machinery.

It is an object of this invention to improve such an intermediary device, by providing what may be called a "universal" pallet, with an adjustment structure, adapting different panels more economically to uniform machinery.

Incident to their rapid transfer motions, the pallets are subject to mechanical impacts; and as a result of such impacts, complex mechanical vibrations of panels and components are likely, whenever pallets are stopped for fabricating operations. Such vibrations tend to vary as every panel is assembled with successive circuit components, producing successive changes of overall weight, center of gravity, moment of inertia and other characteristics affecting vibrations of the panel. Uncontrolled vibrations of the panels tend to cause undesirable losses of time during each cycle of transfer and fabricating operations and to enforce relatively slow cycling. In some cases, there may even be actual injury resulting from abrupt stopping and jarring of transfer instruments, mainly when fragile panels and/or components are handled. It is very desirable that a pallet should allow rapid operations and should still protect the various panels carried thereby from the serious difficulties which may arise due to vibration.

It is an object of this invention to provide such protection; and for this purpose there is provided what may be called a "shock absorber" structure, incorporated in the pallet and more particularly in the aforementioned adjustment structure of a universal pallet.

The stated objects have been achieved by the pallet constructed in accordance with the present invention and particularly by a single, simple, longitudinally adjustable and longitudinally resilient device, provided in the pallet. In combination with said longitudinally adjustable and longitudinally resilient device, the invention comprises frame elements of the utmost simplicity. The economy and speed of the mass fabrication of panels are greatly increased by the new pallets.

The details of the matter will now be described with reference to the drawing appended hereto; and additional features, advantages and objects of the invention may be noted from the detailed disclosure which follows. In the drawing:

Figure 4 is an exploded perspective view of the parts shown in Figure 3.

Figure 5 is a plan view of a modified pallet; and

Figure 1:
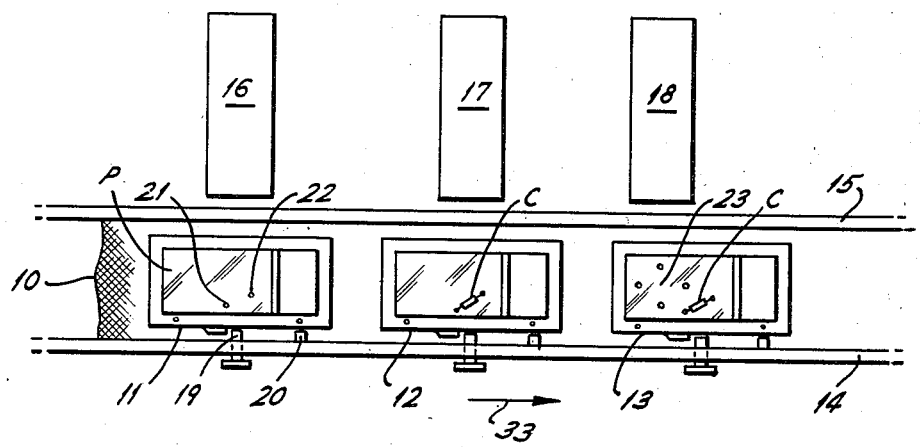
Figure 1 is a diagrammatic plan view of a section of a conveyor system utilizing pallets according to the present invention, with the panels thereon and with the cooperating fabricating heads registered relative thereto.

As shown in Figure 1, a flat conveyor belt 10 supports a series of uniform pallets 11, 12, 13, etc., between a pair of loosely guiding rails 14, 15 extending along a series of fabrication heads 16, 17, 18, etc. Each pallet, with a panel P thereon and with components C successively inserted in the panel, is transferred by the conveyor to the successive fabricating heads and is stopped and positioned in front of each head by stopping and positioning means 19, 20, holding it in a predetermined adjustment longitudinally and transversely of the conveyor. Thus the pallet and its panel P are registered relative to each fabricating head.

In the illustrated section of the machinery, the fabricating head 16 is registered relative to the panel resting in front of it to form a pair of insertion holes 21, 22 in the right hand section of the panel; the head 17 is similarly registered relative to the panel at a subsequent stop position of the latter to insert a component C, such as an axial lead resistor or the like, in said holes; and the head 18 is differently registered relative to the panel, at a third stop of the latter, to form a set of insertion holes 23, etc. in the left hand portion of the panel, for the insertion of some further component by subsequent fabrication heads. The illustrated panels are shown in very simple forms, for purposes of basic explanation; in reality, scores of relatively minute components are often installed on a single panel and interconnected by complex systems of wiring, either "printed" or formed in other manners. Also, while the illustrated panel forms a simple rectangular body, various changes are possible, and often required, as to the forms and dimensions of the panel outlines; for instance, the outline may have to be rounded, circular, elliptic or irregular, depending upon the design of the equipment wherein the panels are to be used. The present pallets, as mentioned, are universal; they can be adjusted to many if not all of these different panel forms and to other panel modifications.

Figure 3:
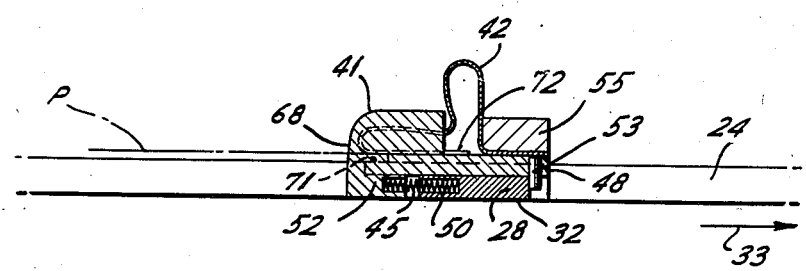
Figure 3 is a detail section, on a still larger scale, substantially along line 3—3 in Figure 2.
Figure 2:
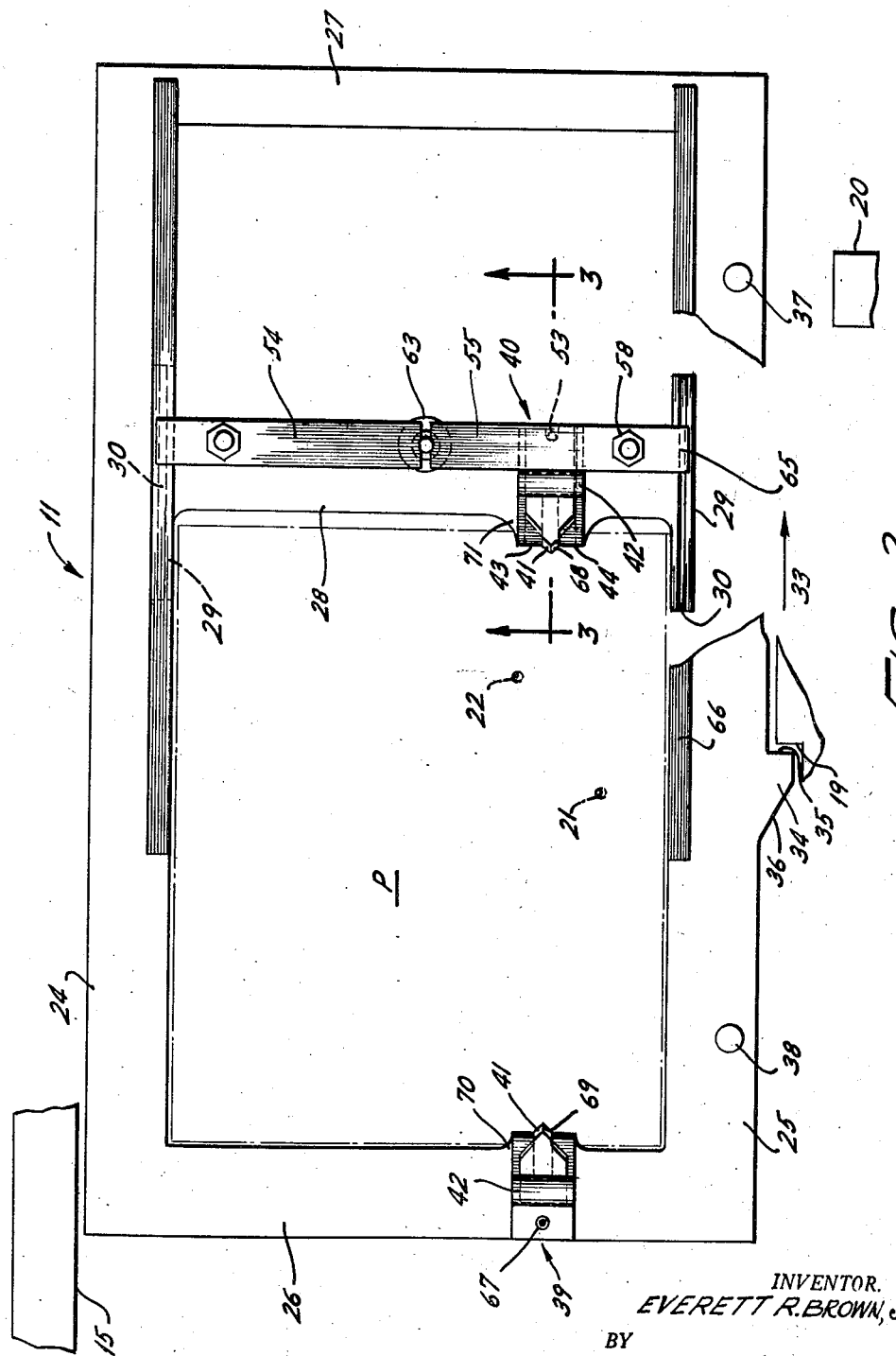
Figure 2 is a plan view, on a larger scale, of one of the pallets with one part broken away.

The preferred manner in which adjustment of the pallet is achieved is shown in Figures 2, 3 and 4. A four-sided pallet frame 11 is here illustrated. This frame may be formed of flat, substantially rigid, metallic plate stock, such as rolled aluminum or steel or the like, in approximately rectangular form and with an approximately rectangular interior aperture. It may have a pair of straight, elongated side bar members 24, 25 and a pair of straight, elongated end bar members 26, 27 at right angles thereto.

It may be noted, parenthetically, that the illustrated members 24 to 27 could be modified in many respects, within the scope of this invention. For instance, side member 24 can be omitted entirely, as long as the end members 26, 27 are of sufficient strength. It may further be noted that the terms "side" and "end," as applied to the members 24 to 27, refer to the transfer motion rather than the shape of the frame; the "end" bars 26, 27 can be made effectively longer than the "side" bars 24, 25.

In effect, such relative lengthening can also be achieved by an adjustment, which will now be described. Between the end bar members 26, 27 a cross bar 28 is shiftable, for instance, slidable, along the side bar members 24, 25, in close and accurately guided contact with at least one of these side bar members, as for instance by means of T-square attachments 29 of the cross bar. Such an attachment may be grooved to provide one or several straight and smooth surfaces 30, parallel to and contacting similar grooves or surfaces 31 extending along the side member 25 (Figures 2 and 4).

Transfer motions are imparted to the pallet by frictional engagement between a lower pallet surface 32 (Figure 3) and the conveyor 10 (Figure 1); and the intended motion is in the general direction of the arrow 33. At the moment when the pallet has reached one of the above-mentioned stop members 19 (Figure 2), an outwardly extending, integral, suitably machined boss or lateral projection 34 on one of the elongated side members, 25, engages this stop member, by contact with one or several surfaces 35, 36 of the boss. At or about this moment, force may also be applied to the pallet by one of the positioning means 20, which may engage pins 37, 38 on the side member 25 to press the opposite side member 24 against the above-mentioned guide rail 15. In this manner, the pallet provides registration of the panel thereon relative to one of the fabricating heads 16, 17, etc. (Figure 1), both longitudinally and transversely of the transfer motion 33.

The circuit panel P is held upon the pallet, to move and stop with the same, by means of a pair of holding and registering devices generally identified by numbers 39 and 40, which are installed respectively on or near the rigid end member 26 and on the slidable cross bar 28. For instance these devices may be installed on said members at positions adjacent to and equi-distant from the side member 25, in which case the pallet can be used for wide as well as narrow panels, whereas it fits short as well as long panels by means of the shiftable cross bar. The holders 39, 40 are adapted to hold the panel against lateral shift, as best shown in Figure 2, and against vertical displacement, as best shown in Figure 3.

The shiftable holder 40 comprises, as best shown in Figure 4, an inclined wedge member 41, slidable relative to the cross bar 28 in a direction parallel to the sides 24, 25. Said holder further comprises a leaf spring 42, having a pair of arms 43, 44, one on each side of the wedge member. Finally it comprises a coil compression spring 45, adapted to urge the wedge member 41 toward the opposite holder 39.

The wedge member 41 is adapted to engage an end portion of the panel P by wedge surfaces 46, facing diagonally in directions having horizontal components directed toward the opposite holder 39 and also having at least slight upward components in order to facilitate insertion and removal of the panel. These surfaces intersect one another along a knife edge 47, lying in a vertical plane parallel to the sides 24, 25. The wedge body, defined by this knife edge and adjacent wedge surfaces may form an integral, upward projection of a small horizontal slider 48 which may be made of steel, the slider being fitted into a matching groove 49, formed in the cross bar 28. The cross bar also has a hole 50 machined into it below and parallel with the groove 49. The aforementioned spring 45 is housed in this hole 50 and bears against a shoulder 51, formed on a shoulder member 52 depending from the slider 48. A stop 53 is provided to prevent excessive inward sliding of the wedge member.

As shown in Figures 2 and 4, locking means for the cross bar 28 are provided by a pair of lock members 54, 55. Each lock member may take the form of a straight, rigid bar of aluminum or steel or the like, having rectangular cross section and extending along the cross bar 28 from adjacent the middle to adjacent one end thereof, with a drilled hole 56 in each lock bar, adjacent the end, for pivoting the lock bar to the cross bar by means of a bolt 57 upwardly threaded into the cross bar and loosely fitting through the drilled hole 56. A nut 58 is installed upon an upper, threaded, reduced diameter portion 59 of the bolt, see Figure 4, and is tightened against a shoulder 60 at the end of the full diameter portion of the bolt. This arrangement provides sufficient clearance for vertical rocking of the lock bar, between the cross bar and the nut. Adjacent the center of the cross bar, a bolt 61 is downwardly threaded into said bar, this bolt being provided with an upwardly facing shoulder portion or washer 62, in contact with the underside of the inner end of each lock bar 54, 55. Rotation of the bolt 61 by means of a knurled head 63, secured to the upper end thereof, raises the inner end 64 of each lock bar and thereby locks the side bars 24, 25 between the outer ends 65 of the lock bars and the T-square attachments 29, the downward pressure being absorbed by suitably machined pressure shoes 66 on the side members 24, 25. Thus the cross bar and each lock bar thereon serve as a clamp member.

In addition each lock bar 54, 55 is also utilized as a retaining member for that flat panel holder spring 42. As best shown in Figure 3, said spring is folded upwardly and is restrained from backward motion by the lock bar and from forward and lateral motion by the wedge member 41.

The panel holder 40, described up to this point, resembles the opposite panel holder 39 (Figure 2), except that the latter is fixed in place, for instance by a set screw 67, instead of being slidable and biased by a compression spring.

Desirably, each panel P has notches 68, 69 located and shaped to match the arrangement and form of the wedge members 41. By this expedient the panel is accurately registered, relative to the pallet, in all horizontal directions.

Accurate vertical registering of the panel, which is also required for rapid and high precision fabrication work, may be provided, as shown in Figures 2 and 3, by depositing one end of the panel upon a suitable surface 70, formed on the pallet end member 26, and depositing the opposite end of the panel upon a similarly formed support surface 71 on the cross bar 28 and inserting each end of the panel below an inner, downwardly folded and downwardly pressing end portion 72 of each holder spring arm 43, 44. The cross bar 28 is rigid enough to make sure that no objectionable, vertical strain affects the position of support surface 71, due to any vertical pressure reactions and bending forces of the lock bars 54, 55. Likewise, no significant inaccuracy is caused by an upward or downward warping of the panel P, even if the panel is quite thin and elastic, the holder spring arms 43, 44 applying purely downward pressure on the panel and the sliding wedge 41 being inwardly spring loaded by its spring 45 with a relatively minor force, as applied to the panel area.

In the operation of the device, a series of pallets 11, 12, 13, etc. are loaded, each with one panel P. Each cross bar is properly adjusted and clamped. A panel, of any desired form, limited only by the size and arrangement of the pallet, is deposited on the surfaces 70, 71; it is then horizontally located by the wedge members 41, and is resiliently held against the surfaces of members 41, 70, 71 by the holder and slider springs 42, 45. Successive pallet and panel combinations are formed in this manner and are manually or automatically deposited upon the conveyor 10, which transfers them in direction 33 to successive fabrication heads 16, 17, 18, etc. Whenever a pallet arrives in front of such a fabrication head, the stop member 19 engages the matching surfaces 35, 36 of the pallet, holding the unit against the transfer effort of the continuously moving conveyor, while a positioning means 20 engages the pins 37, 38 and moves the pallet against the rail 15. The fabricating head can then perform its component-inserting or other fabricating function on the panel. Thereafter the stop member 19 is withdrawn from its pallet-stopping position by suitable actuator means, not shown; the positioning means similarly releases the pins 37, 38, and the pallet is re-engaged by the surface friction or so-called drag effect of the conveyor, and is moved further on, either for further fabrication or for final discharge from the fabricating system.

An important advantage of the new pallet is that it greatly reduces the total tooling cost involved in such a system. Large numbers of panels of any one type are often to be handled; for instance it is quite typical, although purely illustrative, that a hundred thousand or a million of one type of panel must be fabricated and that hundreds or thousands of pallets are required for this purpose. Heretofore, the number of pallets had to be multiplied by the number of types of panels to be fabricated. This is no longer required, by virtue of the new, universal design and adjustment feature of the pallet.

A further advantage of the new pallet is that it adds greatly to the accuracy of the fabricating operations. This is achieved by combining the rigidly installed panel locating means 39 with the shiftable, desirably resiliently biased, positioning means 40 and using them in conjunction with the inherent resilience of the circuit panel or similar article, carried by the pallet. Heretofore, each panel was registered relative to its pallet by dowel pins on the pallet, fitting into holes in the panel. Because of unavoidable warpage of the panels and consequent stresses on insertion of dowels there were unpredictable variations of panel location; and these were great enough, in many cases, to seriously affect the attempt to insert component parts and otherwise to perform fabricating operations with the required precision. A major advantage is gained by the more accurate panel positioning which becomes possible, at a reduced cost, by the new construction. In the new arrangement, a firm and completely predictable reference location is always established for the panel at the knife edge of the fixed holder 39. While all other portions of a warped panel may have slightly irregular positions during transfer from one fabricating station, 16, to another, 17, it becomes easy to establish practically perfect positioning of each panel portion at every station. Known devices, not shown, can be used for this purpose at each station to flatten each panel into a predetermined planar form, preparatory to the fabricating operation.

At the same time this new design and particularly the panel holders thereof provide a possibility of substantially faster fabrication. The slidable wedge member 41 and its compression spring 45 perform a shock absorbing function, along with a part of the panel-holding and registering functions. In the absence of such a shock absorber there may be a danger that some of the components C, previously inserted, may be loosened or even dislodged, by repeated, sudden stopping operations applied to the panel and pallet. Even where no such danger exists, an advantage is provided by the shock absorbing effect of the unit. In the absence of such an effect, each component inserted in the panel would tend to mechanically vibrate at a frequency of its own, after each sudden stop, depending upon the arrangement of its mass and center of gravity; and corresponding vibrations of the panel would follow. Accurate fabrication work cannot very well be undertaken so long as such uncontrolled vibrations prevail. The shock absorbing unit 41, 45 has the effect of substituting, instead, a vibration of the entire panel P, which vibration is minor in amplitude and rapidly damped by virtue of the frictional sliding operation of the member 41. By means of this effect it is possible to increase the speed of transfer, in each operating cycle of the fabricating machine, by an appreciable factor, such as two to one or three to one or more, depending on other points affecting the overall cycle. In the absence of this effect, valuable fractions of each cycle are lost, particularly when rapid operation is attempted.

Figure 6:
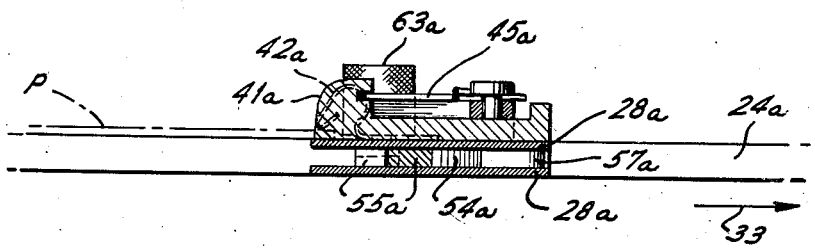
Figure 6 is a detail section generally similar to Figure 3 but taken substantially along the line 6—6 of Figure 5.

Referring finally to the embodiment of Figures 5 and 6: this illustrates a pallet which has been modified in several respects. The cross bar 28a in this case has a positive tooth engagement with the inside of each side member 24a, 25a, by means of tooth members 29a which may be pivoted at 57a and may engage matching tooth racks or, if preferred, more or less smooth edges of suitable hardness on the inside surfaces of the adjacent side members. The adjustment of the cross bar along the pallet becomes more positive by this expedient. While the same expedient eliminates the possibility of stepless adjustment, provided by the design of Figure 2, it still remains possible to utilize the pallet with panels of any desired length up to the limit of pallet adjustment, since minor differences of panel length are compensated for, by different distortions of the biasing spring 45a of the slidable, shock absorbing wedge member 41a. This spring is here shown as a bent wire, urging the member 41a toward the left by reactive force against a rigid pin 45b on cross bar 28a; the wire being held down by a washer 45c on the pin 45b. A system of four leaf springs 42a, two of them adjacent to each positioning wedge 41a, is shown as a hold-down device. The lock bars 54a, 55a form a toggle structure movable in a horizontal plane and actuated by a handle and bolt 63a adapted to be shifted and rotated for resetting and locking the cross bar.

While only two embodiments of the invention have been described, it should be understood that the details thereof are not to be construed as limitative of the invention, except insofar as set forth in the following claims.

I claim:

1. A pallet for transferring and precisely positioning an electrical circuit panel, with respect to successive fabricating heads in a system for mechanized insertion of small components on the panel, said pallet comprising: an open frame, adapted to be transferred from one of said heads to another and then to engage an external control device for registering the frame relative to the other fabricating head; a rigid member extending in one direction across the frame and adapted to be shifted in another direction across the frame; positioning means for rigidly securing said member to the frame in a predetermined position relative thereto; first holder means, carried by and secured to said member, for removably holding one edge of a panel upon the so-positioned member; second holder means, carried by and secured to the frame, for similarly holding another edge of the panel to the frame; stop means forming a rigid part of one of said holder means, for stopping motion and vibration of the panel relative to the frame; and resilient means forming part of one of the holder means for urging the panel against said stop means.

2. Apparatus as described in claim 1, wherein the positioning means comprises a clamping linkage, the frame being adapted to cooperate with said linkage in securing the shiftable member in a predetermined position.

3. Apparatus as described in claim 2 wherein the clamping linkage comprises a pair of links, each extending from between the sides toward one side of the frame and each being pivoted for rocking motions in a vertical plane.

4. Apparatus as described in claim 2 wherein the clamping linkage comprises a pair of toggle members, pivoted for toggle motions in a plane parallel to said frame.

5. Apparatus as described in claim 2 wherein the clamping linkage comprises tooth lock means, forming part of the positioning means, and manually operable means mounted on the positioning means for forcing such lock means to engage and disengage the frame.

6. Apparatus as described in claim 5 wherein the clamping linkage additionally comprises tooth means incorporated in the frame and adapted to engage the tooth lock means.

7. Apparatus as described in claim 1 wherein the frame comprises support means for a panel and each of said holder means comprises spring means adapted to press an end portion of a panel down upon the support means.

8. Apparatus as described in claim 7 wherein the stop means comprises a wedge member adapted to engage a notch in a panel; the resilient means comprising a leaf spring, secured to the support means and having a plurality of arms adapted to press a panel down on the support means, one arm being disposed on each side of the respective wedge member and adjacent thereto.

References Cited in the file of this patent

UNITED STATES PATENTS

| | | |
|---|---|---|
| 1,511,662 | Dirkson et al. | Oct. 14, 1924 |
| 2,514,104 | Sutherland | July 4, 1950 |